United States Patent
Lee et al.

(10) Patent No.: US 10,491,737 B2
(45) Date of Patent: *Nov. 26, 2019

(54) APPARATUS AND METHOD FOR TRANSMITTING AND RECEIVING MULTIMEDIA DATA BY USING NFC

(71) Applicant: Samsung Electronics Co., Ltd., Gyeonggi-do (KR)

(72) Inventors: Kwang-Yong Lee, Seoul (KR); Hyun-Su Hong, Gyeonggi-do (KR); Jung-A Park, Busan (KR); Jong-Hyun An, Seoul (KR); Doo-Yeon Lee, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/966,656

(22) Filed: Apr. 30, 2018

(65) Prior Publication Data

US 2018/0248994 A1   Aug. 30, 2018

Related U.S. Application Data

(63) Continuation of application No. 13/742,007, filed on Jan. 15, 2013, now Pat. No. 9,961,183.

(30) Foreign Application Priority Data

Feb. 21, 2012  (KR) ......................... 10-2012-0017452

(51) Int. Cl.
*H04B 5/00*  (2006.01)
*H04W 4/80*  (2018.01)
(Continued)

(52) U.S. Cl.
CPC ............ *H04M 1/7253* (2013.01); *H04B 5/00* (2013.01); *H04W 4/80* (2018.02); *H04W 12/003* (2019.01);
(Continued)

(58) Field of Classification Search
CPC .................................. H04B 5/00; H04W 4/80
See application file for complete search history.

(56) References Cited

U.S. PATENT DOCUMENTS 8,116,679 B2   2/2012  Dunko
8,570,898 B1  10/2013  Kopikare et al.
(Continued)

FOREIGN PATENT DOCUMENTS

CN   101233699   7/2008
CN   101843124   9/2010
(Continued)

OTHER PUBLICATIONS

Korean Office Action dated Jul. 19, 2018 issued in counterpart application No. 10-2012-0017452, 9 pages.
(Continued)

*Primary Examiner* — Cindy Trandai
(74) *Attorney, Agent, or Firm* — The Farrell Law Firm, P.C.

(57) ABSTRACT

An electronic device, method, and non-transitory computer readable storage medium for sending a multimedia file are provided. The electronic device includes a memory for storing instructions; and a processor configured to execute the instructions to at least: based on user input for sending the multimedia file towards an external device being received, send address information of the electronic device and file information of the multimedia file towards the external device through a near field communication (NFC) circuit of the electronic device, activate a short-range communication circuit of the electronic device based on the address information and the file information of the multimedia file being sent; based on a connection request from the external device being received, connect the electronic device to the external device through the short-range communica-
(Continued)

tion circuit; and send, through the short range communication circuit, the multimedia file towards the external device.

17 Claims, 6 Drawing Sheets

(51) Int. Cl.
    *H04M 1/725* (2006.01)
    *H04W 12/00* (2009.01)
    *H04W 4/08* (2009.01)
    *H04W 8/00* (2009.01)
    *H04W 84/18* (2009.01)
    *H04W 76/14* (2018.01)

(52) U.S. Cl.
    CPC .......... *H04M 2250/04* (2013.01); *H04W 4/08* (2013.01); *H04W 8/005* (2013.01); *H04W 76/14* (2018.02); *H04W 84/18* (2013.01)

(56) References Cited

U.S. PATENT DOCUMENTS

| | | | |
|---|---|---|---|
| 9,043,395 | B2 | 5/2015 | Thangadorai |
| 2004/0054899 | A1 | 3/2004 | Balfanz et al. |
| 2005/0086273 | A1 | 4/2005 | Loebbert et al. |
| 2005/0088980 | A1 | 4/2005 | Olkkonen et al. |
| 2007/0001853 | A1 | 1/2007 | Otranen |
| 2008/0014989 | A1* | 1/2008 | Sandegard ............ G06F 1/1626 455/557 |
| 2008/0057990 | A1 | 3/2008 | Fuccello et al. |
| 2008/0079573 | A1 | 4/2008 | Bloebaum |
| 2008/0096534 | A1 | 4/2008 | Yoon |
| 2008/0153496 | A1* | 6/2008 | Fukuzawa ............ H04W 88/181 455/436 |
| 2008/0198811 | A1 | 8/2008 | Deshpande et al. |
| 2009/0092185 | A1 | 4/2009 | Kwon et al. |
| 2009/0111378 | A1* | 4/2009 | Sheynman ............ H04W 8/005 455/41.1 |
| 2010/0119059 | A1* | 5/2010 | Kojima ............ H04L 45/00 380/42 |
| 2011/0026504 | A1 | 2/2011 | Feinberg |
| 2011/0085529 | A1 | 4/2011 | Choi |
| 2011/0106965 | A1* | 5/2011 | Chun ............ H04L 65/4076 709/231 |
| 2011/0122835 | A1 | 5/2011 | Naito et al. |
| 2011/0145427 | A1* | 6/2011 | Amento ............ H04L 65/1016 709/231 |
| 2011/0149816 | A1* | 6/2011 | Saito ............ H04W 4/08 370/310 |
| 2011/0161697 | A1 | 6/2011 | Qi |
| 2011/0191825 | A1 | 8/2011 | Kageyama et al. |
| 2011/0201275 | A1* | 8/2011 | Jabara ............ H04L 12/5692 455/41.2 |
| 2011/0222474 | A1 | 9/2011 | Kikkawa |
| 2011/0231508 | A1 | 9/2011 | Torii |
| 2011/0275316 | A1 | 11/2011 | Suumaki |
| 2011/0280152 | A1 | 11/2011 | Saito |
| 2011/0282989 | A1 | 11/2011 | Geirhofer |
| 2011/0292300 | A1 | 12/2011 | Nagara |
| 2012/0042102 | A1* | 2/2012 | Chung ............ H04M 1/7253 710/33 |
| 2012/0045994 | A1 | 2/2012 | Koh |
| 2012/0106375 | A1 | 5/2012 | Woo |
| 2012/0134349 | A1 | 5/2012 | Jung |
| 2012/0158839 | A1 | 6/2012 | Hassan |
| 2012/0244902 | A1 | 9/2012 | Saito et al. |
| 2012/0265913 | A1 | 10/2012 | Suumaki |
| 2012/0311723 | A1* | 12/2012 | Britt, Jr. ............ G06Q 30/06 726/28 |
| 2013/0039358 | A1* | 2/2013 | Ejima ............ H04W 84/20 370/338 |
| 2013/0050259 | A1 | 2/2013 | Ahn |
| 2013/0053129 | A1* | 2/2013 | LeMay ............ G07F 17/3223 463/25 |
| 2013/0094484 | A1 | 4/2013 | Kneckt |
| 2013/0204962 | A1 | 8/2013 | Estevez |
| 2013/0223280 | A1 | 8/2013 | Choi |
| 2013/0227152 | A1 | 8/2013 | Lee |
| 2013/0252656 | A1* | 9/2013 | Lee ............ H04W 76/14 455/519 |
| 2014/0051360 | A1 | 2/2014 | Kim |
| 2014/0091987 | A1 | 4/2014 | Lee |
| 2015/0296416 | A1* | 10/2015 | Lee ............ H04W 8/005 370/331 |

FOREIGN PATENT DOCUMENTS

| | | |
|---|---|---|
| EP | 1 395 019 | 3/2004 |
| JP | 2011-166194 | 8/2011 |
| KR | 102011053992 | 5/2011 |
| WO | WO 2005/091572 | 9/2005 |
| WO | WO 2009/104131 | 8/2009 |
| WO | WO 2010/030415 | 3/2010 |

OTHER PUBLICATIONS

European Search Report dated Jan. 3, 2018 issued in counterpart application No. 13156165.6-1854, 4 pages.
Chinese Office Action dated Dec. 16, 2015 issued in counterpart application No. 201310055442.1, 15 pages.
Japanese Office Action dated Mar. 27, 2017 issued in counterpart application No. 2013-030741, 6 pages.
U.S. Appl. Nos. 61/497,508 and 61/515,317.
European Search Report dated Mar. 13, 2019 issued in counterpart application No. 13156165.6-1214, 9 pages.

* cited by examiner

APPARATUS AND METHOD FOR TRANSMITTING AND RECEIVING MULTIMEDIA DATA BY USING NFC

PRIORITY

This continuation application claims priority under 35 U.S.C. § 120 to U.S. patent application Ser. No. 13/742,007, which was filed in the United States Patent and Trademark Office on Jan. 15, 2013, which claimed priority under 35 U.S.C. § 119(a) to Korean Patent Application Serial No. 10-2012-0017452, which was filed in the Korean Intellectual Property Office on Feb. 21, 2012, the contents of each of which is incorporated herein by reference.

BACKGROUND OF THE INVENTION

1. Field of the Invention

The present invention relates generally to an apparatus and a method for transmitting and receiving data, and more particularly, to an apparatus and a method for transmitting and receiving multimedia data by using Near Field Communication (NFC).

2. Description of the Related Art

NFC, which enables an intuitive link between electronic devices, is an advanced wireless communication application technology. In NFC, a non-contact type authentication technology is combined with an Ad-Hoc networking technology based on Radio Frequency IDentification (RFID)-related technology.

The intuitive link of the NFC technology allows a user to easily and safely transmit information, such as, for example, telephone numbers or information required for electronic commerce, by bringing two NFC units into close proximity. The intuitive link also allows the user to perform the exchange of information and an interaction without user intervention relating to a complicated process for setting an environment.

Most electronic devices include NFC units, and each performs a function, such as, for example, a payment, through a mutual touch between the electronic devices.

As described above, the electronic devices, which include the NFC unit, are used to interchange telephone numbers and/or information required for electronic commerce.

However, the NFC function is limited to the exchange of information for a payment.

Also, it is only possible to exchange a very small amount of data. Thus, it is difficult to transmit multimedia data through a communication connection between mobile devices, such as mobile terminals.

SUMMARY OF THE INVENTION

The present invention has been made to address at least the above problems and/or disadvantages and to provide at least the advantages described below. Accordingly, an aspect of the present invention provides an apparatus and a method for transmitting and receiving multimedia data by using NFC.

In accordance with an aspect of the present invention, an electronic device is provided. The electronic device includes a memory for storing instructions; and a processor configured to execute the instructions to at least: based on user input for sending the multimedia file towards an external device being received, send address information of the electronic device and file information of the multimedia file towards the external device through an NFC circuit of the electronic device, activate a short-range communication circuit of the electronic device based on the address information and the file information of the multimedia file being sent; based on a connection request from the external device being received, connect the electronic device to the external device through the short-range communication circuit; and send, through the short range communication circuit, the multimedia file towards the external device.

In accordance with another aspect of the present invention, a method for sending a multimedia file by an electronic device is provided. The method includes, based on user input for sending the multimedia file towards an external device being received, sending address information of the electronic device and file information of the multimedia file towards the external device through an NFC circuit of the electronic device; activating a short-range communication circuit of the electronic device based on the address information and the file information of the multimedia file being sent; based on a connection request from the external device being received, connecting the electronic device to the external device through the short-range communication circuit; and sending, through the short range communication circuit, the multimedia file towards the external device.

In accordance with another aspect of the present invention, a non-transitory computer readable storage medium with instructions stored thereon is provided. The instructions are executable by at least one processor of an electronic device to cause the at least one processor to, based on user input for sending a multimedia file towards an external device being received, sending address information of the electronic device and file information of the multimedia file towards the external device through an NFC circuit of the electronic device; activating a short-range communication circuit of the electronic device based on the address information and the file information of the multimedia file being sent; based on a connection request from the external device being received, connecting the electronic device to the external device through the short-range communication circuit; and sending, through the short range communication circuit, the multimedia file towards the external device.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF EMBODIMENTS OF THE PRESENT INVENTION

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

In embodiments of the present invention, a transmission apparatus and a reception apparatus interchange connection information required for a short-range communication connection in order to transmit multimedia data through an NFC setup, to perform a short-range communication connection between the apparatuses by using the interchanged connection information, and to transmit and receive multimedia data, so that users can share multimedia data with one touch for an NFC setup.

Figure 1:
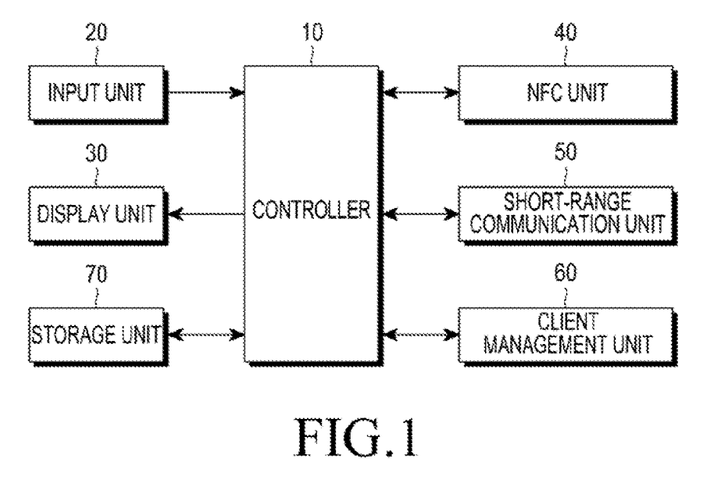
FIG. 1 is a block diagram illustrating a configuration of an apparatus for transmitting and receiving data, according to an embodiment of the present invention.

FIG. 1 is a block diagram illustrating the configuration of an apparatus for transmitting and receiving data, according to an embodiment of the present invention.

An apparatus for transmitting and receiving data according to an embodiment of the present invention includes a controller 10, an input unit 20, a display unit 30, an NFC unit 40, a short-range communication unit 50, a client management unit 60, and a storage unit 70. FIG. 1 of the present invention is a view illustrating an apparatus for transmitting data, but an apparatus for receiving data includes the same elements as the apparatus for transmitting data.

In an embodiment of the present invention, an apparatus for transmitting multimedia data is defined as a transmission apparatus and an apparatus for receiving multimedia data is defined as a reception apparatus. The defined transmission apparatus and the defined reception apparatus are described in greater detail below.

A description is first provided in terms of the transmission apparatus. The controller 10 controls an overall operation of the transmission apparatus. Particularly, when a touch occurs for an NFC setup between the transmission apparatus and the reception apparatus in order to deliver multimedia data from the transmission apparatus to the reception apparatus, the controller 10 controls the NFC unit 40 so as to connect NFC between the transmission apparatus and the reception apparatus.

The controller 10 performs a control operation for delivering file information on the multimedia data intended to be delivered and address information of the transmission apparatus to the reception apparatus through the connected NFC. The controller 10 activates the short-range communication unit 50 for a short-range communication connection. Data information on the multimedia data includes, for example, a file name, a file path, etc., and the address information includes, for example a Media Access Control (MAC) address or a Service Set Identification (SSID) of the transmission apparatus.

Short-range communication includes, for example, Wireless Fidelity (Wi-Fi), Bluetooth, and Wi-Fi Direct. In an embodiment of the present invention, the use of Wi-Fi Direct will be described as an example.

When the reception apparatus attempts to connect to the transmission apparatus through short-range communication, the controller 10 first sets a group owner between the transmission apparatus and the reception apparatus. The apparatuses then share the owner address information of the group owner. When two or more apparatuses are connected to each other through group communication for data communication therebetween, the group owner signifies an apparatus that manages the connected client apparatuses while it plays a leading role in the group communication.

In an embodiment of the present invention, the transmission apparatus intending to deliver data is described as being set as the group owner, for example.

Specifically, in order to set the transmission apparatus as the group owner, the controller 10 performs a control operation for receiving group owner setting information, which includes information for designating an encryption scheme together with information such that the reception apparatus is not the group owner, from the reception apparatus.

The controller 10 sets the transmission apparatus as the group owner based on the received group owner setting information, performs a control operation for delivering owner address information of the group owner, for example, owner Internet Protocol (IP) information to the reception apparatus, and causes the transmission apparatus and the reception apparatus to share the owner address information between them.

When the reception apparatus makes a request for making a connection through short-range communication, the controller 10 controls the short-range communication unit 50 so as to perform a short-range communication connection to the reception apparatus. The reception apparatus may send a request for a short-range communication connection, to the transmission apparatus by using the shared owner address information.

When the connection of the transmission apparatus to the reception apparatus through the short-range communication is completed, the controller 10 controls the client management unit 60 to acquire address information of one or more client apparatuses connected to the transmission apparatus through the short-range communication, so as to generate a client address list. Address information of a client apparatus signifies an IP address of the client apparatus.

The controller 10 controls the short-range communication unit 50 so as to deliver the client address list, together with the address information of the reception apparatus, to the reception apparatus.

Thereafter, the controller 10 performs a control operation for delivering multimedia data intended to be delivered, to the reception apparatus connected through the short-range communication. For example, the controller 10 may perform a control operation so as to read stored multimedia data from the storage unit 70, and so as to deliver the read multimedia data to the reception apparatus. Otherwise, the controller 10 may perform a control operation for delivering multimedia data that is being displayed on a screen of the transmission apparatus, to the reception apparatus.

The input unit 20 may be implemented by a keypad or the like, and includes multiple keys for inputting numbers and characters, function keys for interfacing with a user, a key for making a phone call, a key for answering a phone call, etc.

The display unit 30 may be implemented by a Liquid Crystal Display (LCD) or the like, and outputs various display data and text messages, and the like, which are generated by a mobile communication terminal 100.

When the NFC unit 40 is connected to an external apparatus through an NFC chip included in the transmission apparatus, the NFC unit 40 exchanges data required for a communication setup with the external apparatus in order to enable short-range communication with the external apparatus.

The short-range communication unit 50 performs short-range communication with the external apparatus by using a Bluetooth module, a Wi-Fi module, or a Wi-Fi Direct module included in the transmission apparatus.

The client management unit 60 manages address information of one or more client apparatuses connected to the group owner through short-range communication, and generates a client address list including the address information of the one or more client apparatuses. The client apparatuses signify the other apparatuses, except for the apparatus that is set as the group owner among apparatuses connected through short-range communication.

The storage unit 70 stores multiple programs and data used in the transmission apparatus, and particularly, stores at least one multimedia data.

A description is provided below in which the apparatus of FIG. 1 is the reception apparatus. The controller 10 controls an overall operation of the reception apparatus. Particularly, when a touch occurs for an NFC setup between the transmission apparatus and the reception apparatus in order to deliver multimedia data from the transmission apparatus to the reception apparatus, the controller 10 controls the NFC unit 40 so as to connect the reception apparatus to the transmission apparatus through NFC.

When file information on multimedia data and address information of the transmission apparatus are received from the transmission apparatus, the controller 10 activates the short-range communication unit 50 for a short-range communication connection.

The controller 10 performs a control operation for attempting to connect to the transmission apparatus through short-range communication, sets a group owner between the transmission apparatus and the reception apparatus, and performs a control operation for receiving owner address information of the group owner from the transmission apparatus.

Specifically, in order to set the transmission apparatus as the group owner, the controller 10 performs a control operation for delivering group owner setting information, which includes information for designating an encryption scheme together with information such that the reception apparatus is not the group owner, to the transmission apparatus. Thereafter, the controller 10 performs a control operation for receiving owner address information of the group owner, for example, owner IP information, from the transmission apparatus, so that the transmission apparatus and the reception apparatus may share the owner address information.

The controller 10 performs a control operation so as to send a request for a short-range communication connection, to the transmission apparatus by using the shared owner address information, and so as to perform a short-range communication connection to the transmission apparatus.

When the connection of the reception apparatus to the transmission apparatus through the short-range communication is completed, the controller 10 performs a control operation for receiving a client address list including address information of one or more client apparatuses connected to the transmission apparatus through the short-range communication together with address information of the reception apparatus, from the transmission apparatus.

Thereafter, the controller 10 controls the short-range communication unit 50 to receive multimedia data from the transmission apparatus. In an embodiment of the present invention, the reception apparatus has the client address list. Accordingly, the received multimedia data may be delivered to another apparatus by using address information of another apparatus. Thereby, multiple apparatuses may share multimedia data.

The input unit 20 may be implemented by a keypad or the like, and includes multiple keys for inputting numbers and characters, function keys for interfacing with a user, a key for making a phone call, a key for answering a phone call, etc.

The display unit 30 may be implemented by an LCD or the like, and outputs various display data and text messages, and the like, which are generated by the mobile communication terminal 100.

When the NFC unit 40 is connected to an external apparatus through an NFC chip included in the reception apparatus, the NFC unit 40 exchanges data required for a communication setup with the external apparatus in order to enable short-range communication with the external apparatus.

The short-range communication unit 50 performs short-range communication with the external apparatus by using a Bluetooth module, a Wi-Fi module, or a Wi-Fi Direct module included in the reception apparatus.

The storage unit 70 stores multiple programs and data used in the reception apparatus, and particularly, stores at least one multimedia data.

In an embodiment of the present invention, the reception apparatus includes elements similar to those of the transmission apparatus, except for the client management unit 60.

As described above, embodiments of the present invention enable the user to easily share multimedia data content with multiple users through a simple connection action, such as an NFC touch.

Figure 2:
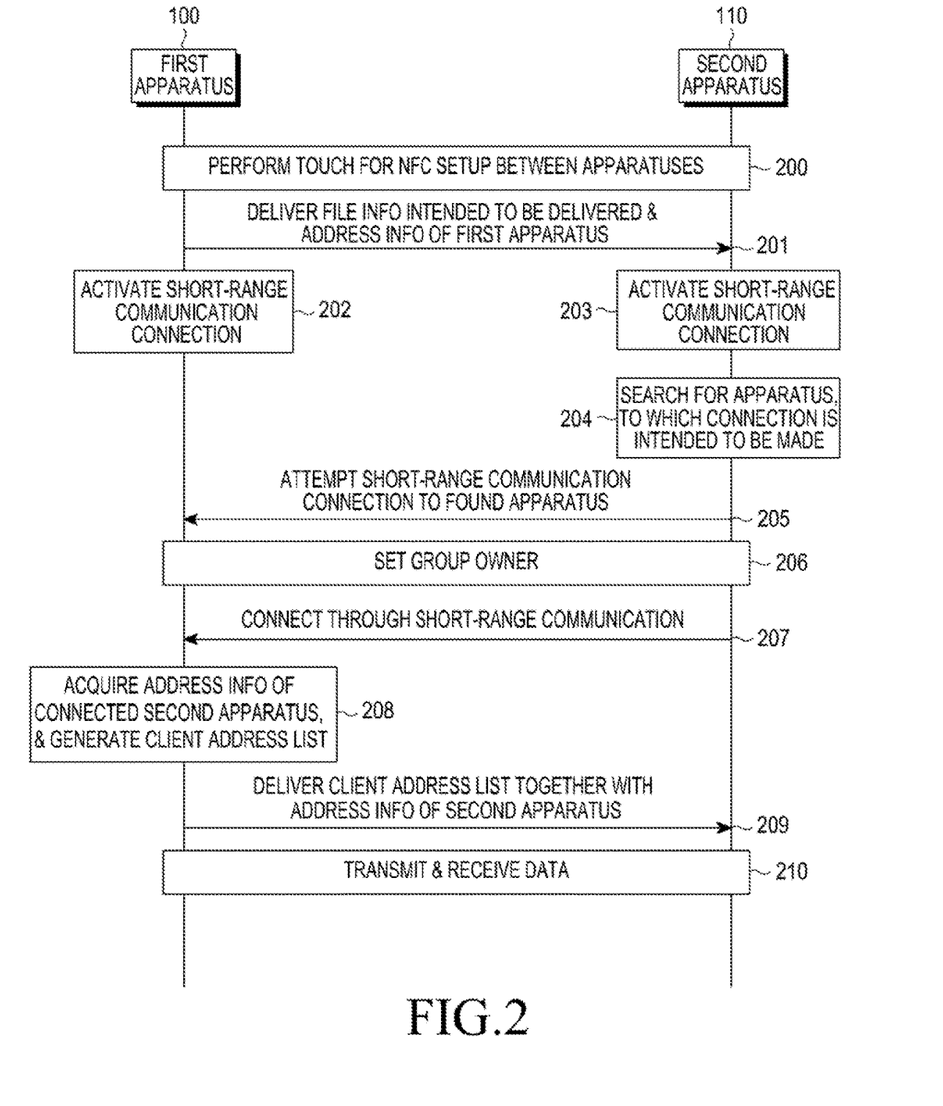
FIG. 2 is a signal flow diagram illustrating a process for transmitting and receiving data between apparatuses, according to an embodiment of the present invention.

FIG. 2 is a signal flow diagram illustrating a process for transmitting and receiving data between apparatuses, according to an embodiment of the present invention.

In an embodiment of the present invention, the transmission apparatus corresponds to a first apparatus 100 and the reception apparatus corresponds to a second apparatus 110. Also, in an embodiment of the present invention, a process in which an image file being currently displayed by the first apparatus 100 is delivered to the second apparatus 110, is described as an example.

In step 200, in order to transmit an image file being currently displayed by the first apparatus 100 to the second apparatus 110, the first apparatus 100 and the second apparatus 110 perform a touch for an NFC setup between the first apparatus 100 and the second apparatus 110.

Such a touch for an NFC setup enables the exchange of data between apparatuses, in such a manner as to bring the apparatuses, which each including an NFC chip for NFC, close to each other by a distance previously set for NFC.

In step 201, the first apparatus 100 delivers data information of an image file intended to be delivered and address information of the first apparatus 100 to the second apparatus 110. In step 202, the first apparatus 100 activates a short-range communication connection at the first apparatus 100. In step 203, the second apparatus 110 activates a short-range communication connection at the second apparatus 110.

In step 204, the second apparatus 110 searches for an apparatus, to which the second apparatus 110 intends to connect, by using the received address information of the first apparatus 100. The second apparatus 110 may first scan address information of each of apparatuses located around the second apparatus 110, through a search for an apparatus, which is made through Wi-Fi Direct communication, and may then search for an apparatus, to which the second apparatus 110 intends to connect.

In step 205, the second apparatus 110 attempts a short-range communication connection to the found apparatus, namely, the first apparatus 100.

In step 206, the first apparatus 100 and the second apparatus 110 set a group owner for short-range communication.

Specifically, in order to set the first apparatus 100 for transmitting an image file as the group owner, the second apparatus 110 delivers information for designating an encryption scheme, together with information indicating that the second apparatus 110 is not the group owner, to the first apparatus 100. For example, the second apparatus 110 always delivers WifiP2pConfig.wps.setup=WpsInfo.PBC, the value of which is for designating an encryption scheme, together with WifiP2pConfig.groupOwnerIntent=0 corresponding to a value representing both GroupOwner:yes indicating that the first apparatus 100 is the group owner, and GroupOwner:no indicating that the second apparatus 110 is not the group owner.

In step 207, the second apparatus 110 performs a short-range communication connection to the first apparatus 100, and then, the first apparatus 100 and the second apparatus 110 are connected to each other through short-range communication.

In step 208, the first apparatus 100 acquires address information of the connected second apparatus 110, and then generates a client address list. The generated client address list may include not only the address information of the second apparatus 110, but also address information of a client apparatus connected to the first apparatus 100.

In step 209, the first apparatus 100 delivers the client address list, together with the address information of the second apparatus 110, to the second apparatus 110.

In step 210, the first apparatus 100 transmits and receives data to/from the second apparatus 110.

In an embodiment of the present invention, the first apparatus 100 serves as a server, and the second apparatus 110 serves as a client. The first apparatus 100 delivers an image file being displayed on a screen thereof to the second apparatus 110 through the connected short-range communication. The second apparatus 110, which receives the image file, displays the received image file on a screen thereof, and thereby, may share data with the first apparatus 100.

As described above, in an embodiment of the present invention, the user may easily share multimedia data content with multiple users, through a simple connection action, such as, for example, an NFC touch.

Figure 3:
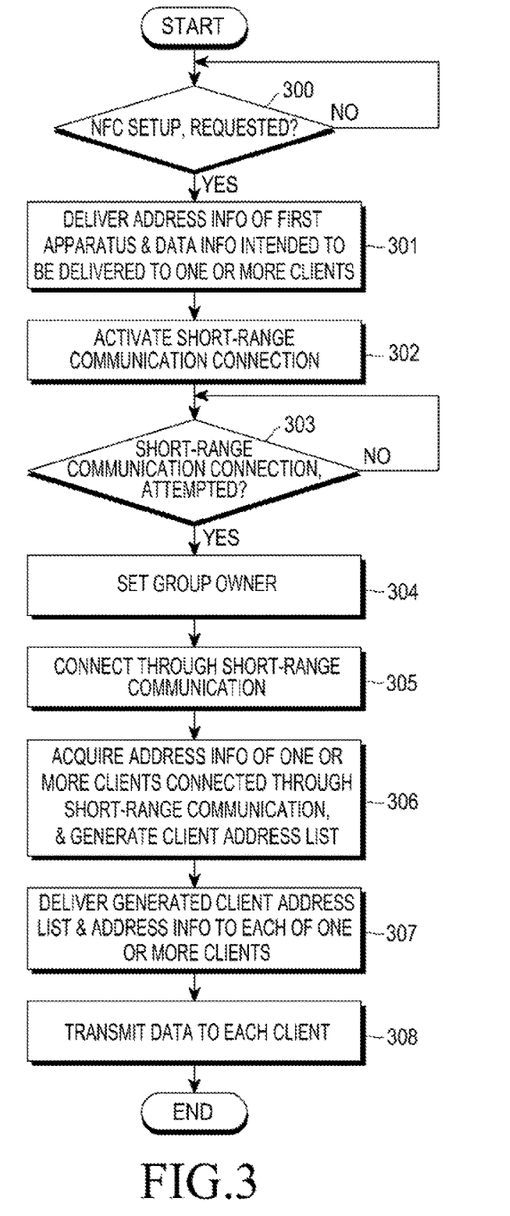
FIG. 3 is a flowchart illustrating a process in which a transmission apparatus transmits and receives data to/from a reception apparatus, according to an embodiment of the present invention.

FIG. 3 is a flowchart illustrating a process in which the first apparatus transmits and receives data to/from one or more other apparatuses, according to an embodiment of the present invention.

In step 300, the controller 10 determines whether a request for an NFC setup is made. When the request for the NFC setup is made, the controller 10 proceeds to step 301. In contrast, when the request for the NFC setup is not made, the controller 10 continuously determines in step 300 whether the first apparatus requests the NFC setup.

In step 301, the controller 10 delivers address information of the first apparatus and data information that the first apparatus intends to deliver, to one or more client apparatuses. The one or more client apparatuses include the second apparatus 110.

In step 302, the controller 10 activates a short-range communication connection, and controls the short-range communication unit 50 so as to operate.

In step 303, the controller 10 determines whether the one or more other apparatuses attempt to connect to the first apparatus through short-range communication. When the one or more other apparatuses attempt to connect to the first apparatus through short-range communication, the controller 10 proceeds to step 304. In contrast, when the one or more other apparatuses do not attempt to connect to the first apparatus through short-range communication, the controller 10 continuously determines in step 303 whether the one or more other apparatuses attempt to connect to the first apparatus through short-range communication.

In step 304, the controller 10 sets a group owner between the first apparatus 100 and the one or more other apparatuses. The controller 10 receives owner setting information indicating that the one or more other apparatuses 110 are not group owners, from the one or more other apparatuses, and sets the first apparatus 100 as the group owner based on the received owner setting information. Thereafter, the controller 10 delivers address information of the group owner to the one or more other apparatuses.

In step 305, the controller 10 connects the first apparatus 100 to the one or more other apparatuses through short-range communication. The first apparatus 100 is set as the group owner, and the one or more other apparatuses are set as one or more client apparatuses.

In step 306, the controller 10 first acquires address information of the one or more client apparatuses connected to the first apparatus 100 through the short-range communication, and then generates a client address list. The controller 10 acquires the address information of the second apparatus 110. Namely, the controller 10 may acquire an IP address of the second apparatus 110 through an IP layer module of the second apparatus 110.

In step 307, the controller 10 delivers the generated client address list and address information of each of the one or more client apparatuses, to each of the one or more client apparatuses.

In step 308, the controller 10 delivers multimedia data to each client apparatus.

As described above, an embodiment of the present invention enables the user to easily share multimedia data content with multiple users through a simple connection action, such as, for example, an NFC touch.

Figure 4:
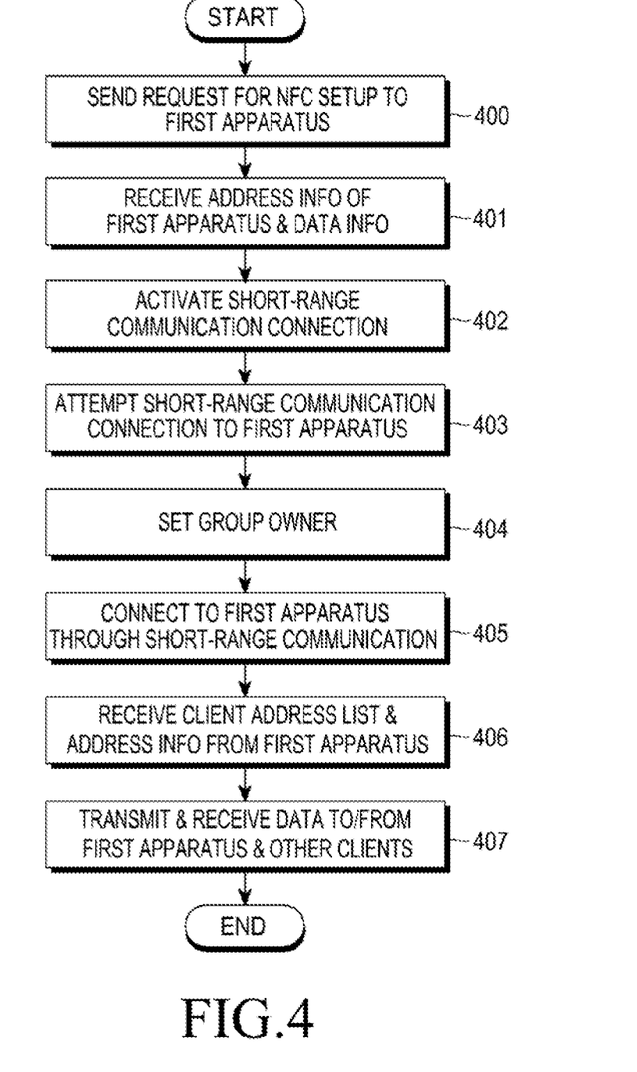
FIG. 4 is a flowchart illustrating a process in which a reception apparatus transmits and receives data to/from a transmission apparatus, according to an embodiment of the present invention.

FIG. 4 is a flowchart illustrating a process in which a reception apparatus transmits and receives data to/from a transmission apparatus, according to an embodiment of the present invention.

In an embodiment of the present invention, an apparatus intending to deliver multimedia data is embodied as the first apparatus.

In step 400, the controller 10 sends a request for an NFC setup, to the first apparatus 100. The request for the NFC setup may be achieved when the first apparatus 100 and the second apparatus 110 move in close proximity to each other, by a distance which is previously set for the NFC setup between the first apparatus 100 and the second apparatus 110.

In step 401, the controller 10 receives address information of the first apparatus 100, and data information of multimedia data intended to be received from the first apparatus 100, from the first apparatus 100.

In step 402, the controller 10 activates the short-range communication unit 50 for a short-range communication connection.

In step 403, the controller 10 attempts a short-range communication connection to the first apparatus 100. The controller searches for an apparatus, to which the second apparatus intends to connect, by using the address information of the first apparatus 100 received from the first apparatus 100, and attempts a short-range communication connection to the found first apparatus 100.

In step 404, the controller 10 sets a group owner between the first apparatus 100 and the second apparatus 110. Specifically, in order to fix the first apparatus 100 intending to transmit the multimedia data as the group owner, the controller 10 transmits information indicating that the second apparatus 110 is not the group owner, to the first apparatus 100. For example, the controller 10 always delivers WifiP2pConfig.wps.setup=WpsInfo.PBC, the value of which designates an encryption scheme, together with WifiP2pConfig.groupOwnerIntent=0 corresponding to a value representing both GroupOwner:yes indicating that the first apparatus 100 is the group owner, and GroupOwner:no indicating that the second apparatus 110 is not the group owner.

In step 405, the controller 10 connects the second apparatus to the first apparatus 100 through short-range communication.

In step 406, the controller 10 receives a client address list and address information of the second apparatus 110, from the first apparatus 100. The controller 10 may detect address information such as an IP address of the first apparatus 100, through the address information received from the first apparatus 100.

In step 407, the controller 10 transmits and receives multimedia data to/from the first apparatus 100. Also, the controller 10 transmits and receives multimedia data to/from the other apparatuses, as well as the first apparatus 100.

As described above, an embodiment of the present invention enables the user to easily share multimedia data content with multiple users through a simple connection action, such as, for example, an NFC touch.

In an embodiment of the present invention, the apparatuses may be connected through one-to-many communication, as well as one-to-one communication, and thereby, may share multimedia data. This configuration is described in greater detail below with reference to FIG. 5.

Figure 5:
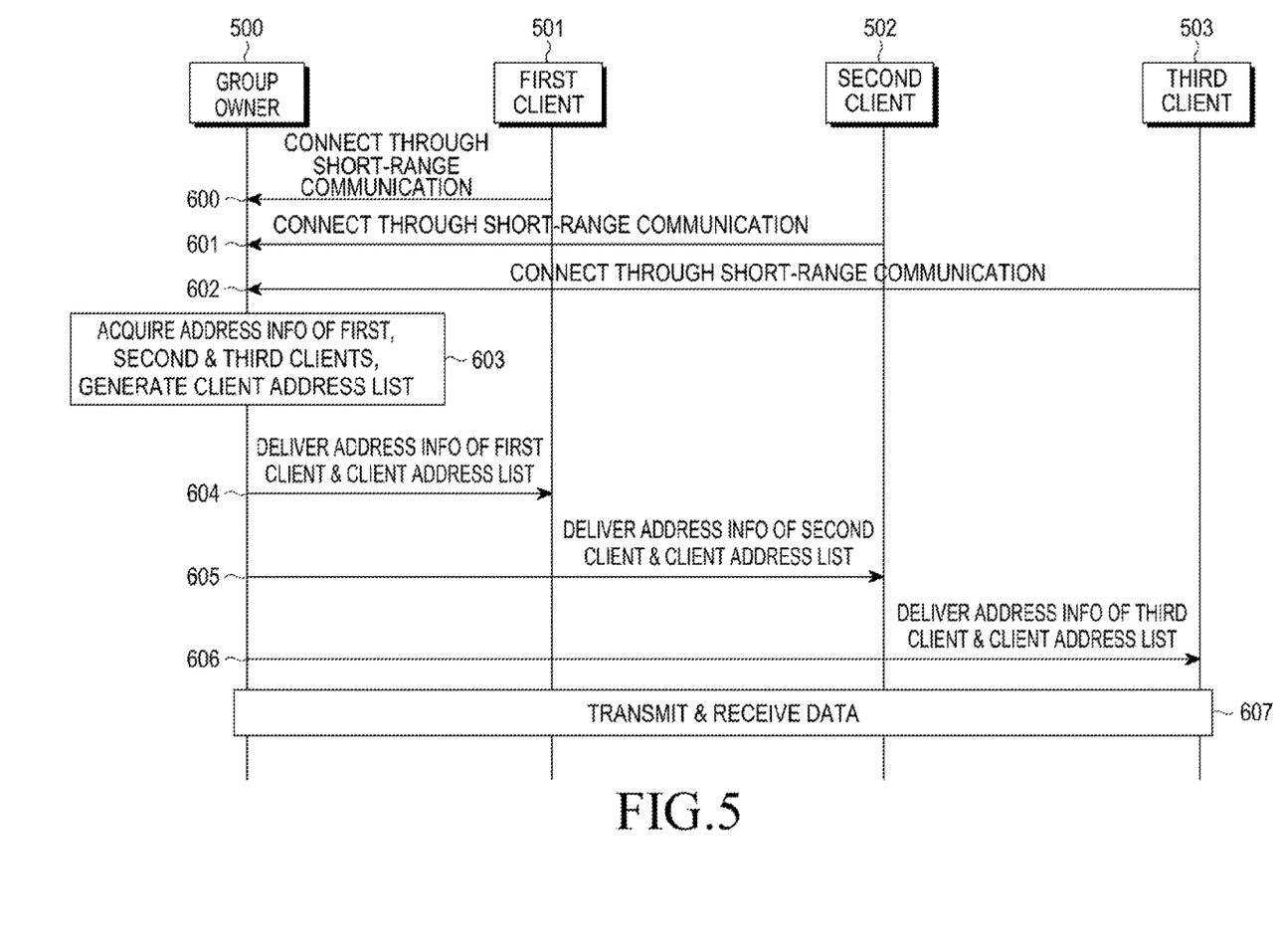
FIG. 5 is a signal flow diagram illustrating a process in which a transmission apparatus transmits and receives data to/from two or more reception apparatuses, according to an embodiment of the present invention.

FIG. 5 is a signal flow diagram illustrating a process in which a transmission apparatus transmits and receives data to/from two or more reception apparatuses, according to an embodiment of the present invention.

In an embodiment of the present invention, the execution of an NFC connection and a short-range communication connection is provided for transmitting and receiving multimedia data among a group owner 500, a first client 501, a second client 502 and a third client 503. The NFC connection and the short-range communication connection are the same as that described above with reference to FIG. 2 to FIG. 4. Through the NFC connection and the short-range communication connection, an embodiment of the present invention enables the group owner to share data with the clients, and also enables the sharing of data between the clients.

In step 600, the group owner 500 connects to the first client 501 through short-range communication. In step 601 and step 602, the group owner 500 connects to the second client and the third client, respectively, through short-range communication.

In step 603, the group owner 500 acquires address information of the first client 501, the second client 502 and the third client 503, and then generates a client address list including the acquired address information.

In step 604, the group owner 500 delivers the address information of the first client and the client address list to the first client 501.

In step 605, the group owner 500 delivers the address information of the second client 502 and the client address list to the second client 502.

In step 606, the group owner 500 delivers the address information of the third client 503 and the client address list to the third client 503.

In step 607, the group owner 500 performs the transmission and reception of data, and delivers multimedia data to each of the first client 501, the second client 502 and the third client 503. A process for transmitting and receiving data may be bidirectionally performed after the first transmission and reception of multimedia data is completed a single time. For example, the first client 501 may transmit and receive data to/from the group owner 500.

Also, the apparatuses may freely transmit and receive multimedia data to/from each other, even in the cases of one-to-many communication and one-to-one communication. For example, the second client 502 and the third client 503 may first perform an NFC connection and a short-range communication connection to the first client 501 through an NFC touch, and may then share multimedia data with the first client 501. When the second client 502 and the third client 503 share the multimedia data with the first client 501 as described above, the first client 501 may deliver multimedia data by using the address information of the second client and the address information of the third client in the client address list.

In an embodiment of the present invention, the apparatuses may freely transmit and receive multimedia data, such as, for example, a photograph file, a music file, a video file and a document file, to/from each other through the process described above.

Figure 6:
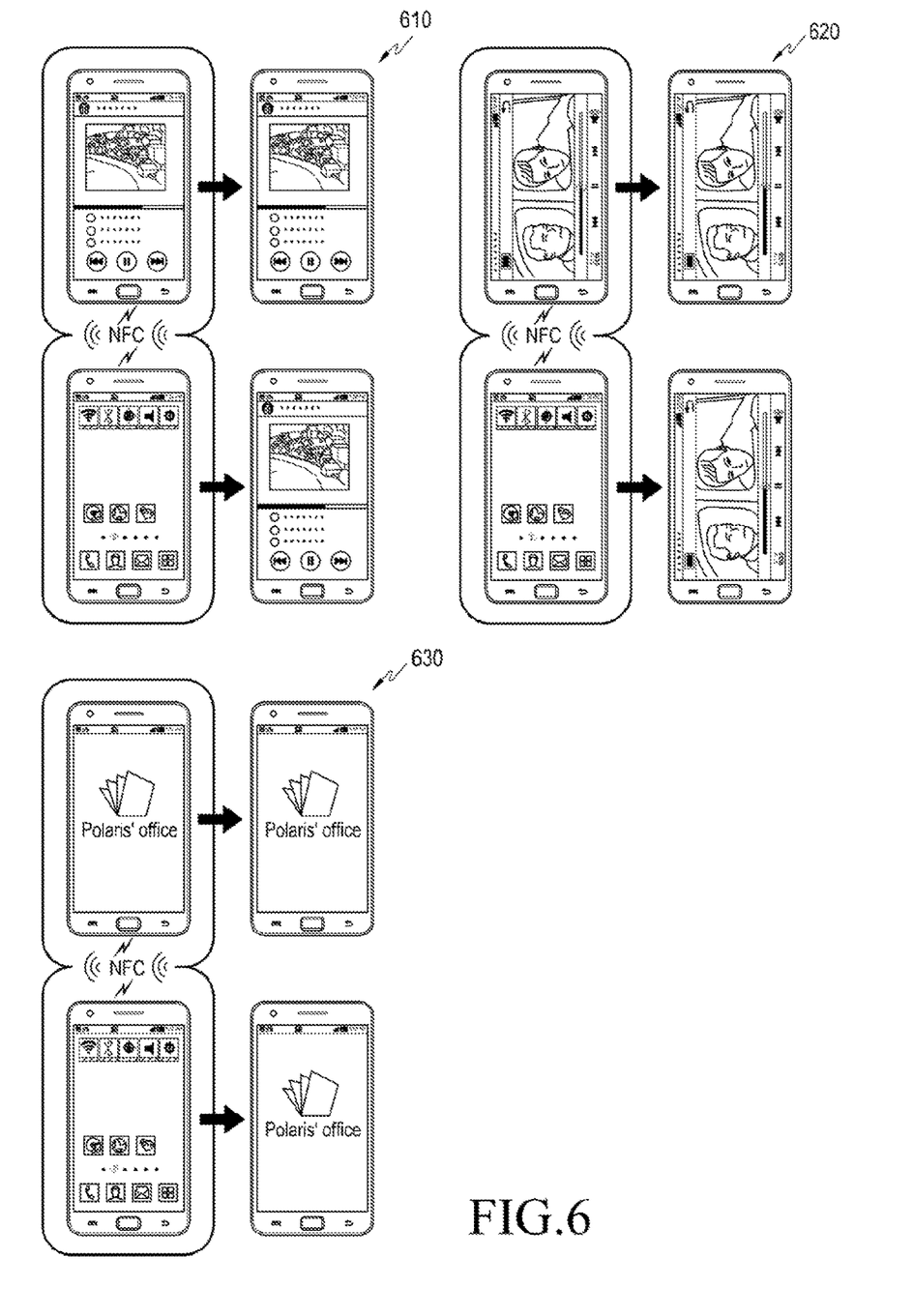
FIG. 6 illustrates transmission and reception of multimedia data between apparatuses by using NFC, according to an embodiment of the present invention.

FIG. 6 illustrates the transmission and reception of multimedia data between apparatuses each for transmitting and receiving multimedia data, by using NFC, according to an embodiment of the present invention.

In the case of a music file, as denoted by reference numeral 610 of FIG. 6, the first apparatus 100 transmits the music file, that the first apparatus 100 is reproducing or temporarily stops reproducing, to the second apparatus 110 through the above process, and the second apparatus 110 immediately reproduces the received music file. Accordingly, the first apparatus 100 and the second apparatus 110 may reproduce the identical music file.

In the case of a video file, as denoted by reference numeral 620 of FIG. 6, the first apparatus 100 transmits a video file, that the first apparatus 100 is reproducing or temporarily stops reproducing, to the second apparatus 110 through the above process, and the second apparatus 110 immediately reproduces the received video file. Accordingly, the first apparatus 100 and the second apparatus 110 may reproduce the identical video file.

Further, in the case of a document file, as denoted by reference numeral 630 of FIG. 6, the first apparatus 100 transmits a document file, that is being written by using the first apparatus 100 or is displayed by it, to the second apparatus 110 through the above process, and the second apparatus 110 immediately displays the received document file. Accordingly, the first apparatus 100 and the second apparatus 110 may share the identical document file.

As described above, the present invention enables the user to easily share multimedia data content with multiple users through a simple connection action, such as, for example, an NFC touch.

It will be appreciated that the embodiments of the present invention may be implemented in the form of hardware, software, or a combination of hardware and software. Any such software may be stored in a volatile or non-volatile storage device such as a Read-Only Memory (ROM), or in a memory such as a Random Access Memory (RAM), a memory chip, a memory device or a memory integrated circuit, or in a storage medium, such as a Compact Disc (CD), a Digital Versatile Disc (DVD), a magnetic disk or a magnetic tape, which is optically or magnetically recordable and simultaneously, is readable by a machine (for example, a computer), regardless of whether the software can be deleted or rewritten. It can be appreciated that the method for transmitting and receiving multimedia data according to an embodiment of the present invention may be implemented by a computer or a portable terminal including a controller and a memory, and that the memory is an example of a machine-readable storage medium suitable for storing a program or programs including directions for implementing embodiments of the present invention. Accordingly, embodiments of the present invention include a program including a code for implementing an apparatus or a method claimed in any claim of this specification, and a storage medium for storing this program, which is readable by a machine (a computer, etc.). Also, this program may be electronically conveyed via any medium such as a communication signal transmitted through a wired or wireless connection, and embodiments of the present invention suitably includes equivalents of this program.

Also, the transmission/reception apparatus may receive a program from an apparatus for providing a program, which is connected by wire or wirelessly, and may store the received program. The apparatus for providing a program may include: a memory for storing a program including instructions causing the transmission/reception apparatus to perform a previously-set method for protecting content, information required for the method for protecting content, and the like; a communication unit for performing wired or wireless communication with the transmission/reception apparatus; and a controller for performing a control operation for transmitting the relevant program to the transmission/reception apparatus, at the request of the mobile apparatus or automatically.

Embodiments of the present invention are advantageous in that the apparatuses can intuitively and simply share multimedia content between them through an NFC touch.

Further, embodiments of the present invention enable the user to easily share multimedia data content with multiple users through a simple connection action, such as, for example, an NFC touch.

While the invention has been shown and described with reference to certain embodiments thereof, it will be understood by those skilled in the art that various changes in form and detail may be made therein without departing from the spirit and scope of the invention as defined by the appended claims and equivalents thereof.

What is claimed is:

1. An electronic device for sending a multimedia file, the electronic device comprising:
a memory for storing instructions; and
a processor configured to execute the instructions to at least:
based on user input for sending the multimedia file towards an external device being received, send address information of the electronic device and file information of the multimedia file towards the external device through a near field communication (NFC) circuit of the electronic device,
activate a short-range communication circuit of the electronic device based on the address information and the file information of the multimedia file being sent;
based on a connection request from the external device being received, connect the electronic device to the external device through the short-range communication circuit; and
send, through the short range communication circuit, the multimedia file towards the external device.

2. The electronic device of claim 1, wherein, during a transmission of the multimedia file, the multimedia file is reproduced at the external device.

3. The electronic device of claim 1, wherein the address information includes a media access control (MAC) address of the electronic device or a service set identification (SSID) of the electronic device.

4. The electronic device of claim 1, wherein the processor is further configured to execute the instructions further to,
in response to owner related information indicating that the external device is not a group owner being received from the external device, set the electronic device as the group owner of a group including the electronic device and the external device.

5. The electronic device of claim 4, wherein the processor is further configured to execute the instructions further to receive, through the NFC circuit, from the external device, group owner setting information for designating an encryption scheme to be used between the external device and the electronic device, along with the owner related information.

6. The electronic device of claim 4, wherein the processor is further configured to execute the instructions further to:
generate a client address list including address information of the external device, and
send, through the short-range communication circuit, the address information of the external device and the client address list to the external device.

7. The electronic device of claim 6, wherein, after sending the client address list towards the external device, the multimedia file is sent from the external device towards one or more other devices registered in the client address list.

8. The electronic device of claim 1, wherein the file information includes a file name of the multimedia file or a file path of the multimedia file.

9. A method for sending a multimedia file by an electronic device, the method comprising:
based on user input for sending the multimedia file towards an external device being received, sending address information of the electronic device and file information of the multimedia file towards the external device through a near field communication (NFC) circuit of the electronic device;
activating a short-range communication circuit of the electronic device based on the address information and the file information of the multimedia file being sent;
based on a connection request from the external device being received, connecting the electronic device to the external device through the short-range communication circuit; and
sending, through the short range communication circuit, the multimedia file towards the external device.

10. The method of claim 9, wherein, during a transmission of the multimedia file, the multimedia file is reproduced at the external device.

11. The method of claim 9, wherein the address information includes a media access control (MAC) address of the electronic device or a service set identification (SSID) of the electronic device.

12. The method of claim 9, further comprising:
in response to owner related information indicating that the external device is not a group owner being received from the external device, setting the electronic device as the group owner of a group including the electronic device and the external device.

13. The method of claim 12, wherein the owner related information is sent from the external device to the electronic device along with group owner setting information for designating an encryption scheme to be used between the external device and the electronic device.

14. The method of claim 12, further comprising:
generating a client address list including address information of the external device; and
sending, through the short-range communication circuit, the address information of the external device and the client address list towards the external device.

15. The method of claim 14, wherein, after sending the client address list to the external device, the multimedia file is sent from the external device towards one or more other devices registered in the client address list.

16. The method of claim 9, wherein the file information includes a file name of the multimedia file or a file path of the multimedia file.

17. A non-transitory computer readable storage medium with instructions stored thereon, wherein the instructions are executable by at least one processor of an electronic device to cause the at least one processor to:
based on user input for sending a multimedia file towards an external device being received, sending address information of the electronic device and file information of the multimedia file towards the external device through a near field communication (NFC) circuit of the electronic device;
activating a short-range communication circuit of the electronic device based on the address information and the file information of the multimedia file being sent;
based on a connection request from the external device being received, connecting the electronic device to the external device through the short-range communication circuit; and
sending, through the short range communication circuit, the multimedia file towards the external device.

* * * * *